United States Patent [19]

Edwards, III

[11] Patent Number: 5,315,822
[45] Date of Patent: May 31, 1994

[54] GAS TURBINE ELEMENTS REARING COKE INHIBITING COATINGS OF TITANIUM COMPOUNDS

[75] Inventor: William H. Edwards, III, Port St. Lucie, Fla.

[73] Assignee: United Technologies Corporation, Hartford, Conn.

[21] Appl. No.: 812,255

[22] Filed: Dec. 20, 1991

[51] Int. Cl.⁵ ................................ F02K 3/10
[52] U.S. Cl. ................... 60/261; 427/248.1
[58] Field of Search ............ 60/261, 752, 734; 427/248.1

[56] References Cited

U.S. PATENT DOCUMENTS

| | | | |
|---|---|---|---|
| Re. 33,919 | 5/1992 | Kristoff et al. | 123/179.31 |
| 2,671,314 | 3/1954 | Lichty | 60/39.02 |
| 4,162,338 | 7/1979 | Schintlmeister | 427/249 |
| 4,176,045 | 11/1979 | Leftin et al. | 208/48 R |
| 4,297,150 | 10/1981 | Foster et al. | 148/6.3 |
| 4,540,596 | 9/1985 | Nimmagadda | 427/248.1 |
| 4,904,528 | 2/1990 | Gupta et al. | 427/37 |
| 4,923,747 | 5/1990 | McCullough, Jr. et al. | 428/312.6 |
| 4,942,732 | 7/1990 | Priceman | 60/261 |
| 4,951,878 | 8/1990 | Casey et al. | 137/549 |
| 5,087,477 | 2/1992 | Giggins, Jr. et al. | 427/419.7 |

*Primary Examiner*—Bertsch: Richard A.
*Assistant Examiner*—Michael I. Kocharov
*Attorney, Agent, or Firm*—Herbert W. Mylius

[57] ABSTRACT

Fuel contacting elements for gas turbines comprise high temperature alloys having a coke inhibiting layer of titanium carbide, titanium nitride, titanium boride, or mixtures thereof.

17 Claims, No Drawings

GAS TURBINE ELEMENTS REARING COKE INHIBITING COATINGS OF TITANIUM COMPOUNDS

The invention was made under a U.S. Government contract and the Government has rights herein.

BACKGROUND OF THE INVENTION

1. Field of the Invention

This invention relates to materials for use in preventing the deposition of carbon, or coke, on fuel wetted surfaces located in high temperature zones of gas turbine engines.

Coke deposition is an undesirable side effect caused by the catalytic-thermal degradation of hydrocarbon fuels during their consumption in gas turbine engines. Such deposition leads to performance loss, reduced heat transfer efficiencies, increased pressure drops, costly decoking procedures, and increased rates of material corrosion and erosion. The metals most prone to catalyze coke deposition are those metals commonly found in the alloys utilized in components exposed to high temperature, fuel wetted environments of gas turbine engines, typically found in jet engines in the combustor and afterburner fuel delivery systems.

2. Description of the Prior Art

Carburization, or the formation of coke deposits, has been noted particularly in high temperature environments where carbon containing fluids come in contact with metals or metal alloys. Exemplary of such environments are high temperature reactors, such as refinery crackers, thermal crackers, distillation units for petroleum feedstock, and gas turbine components. Conventional methods used to reduce coke formation and carburization in steam cracking operations involve the steam pretreatment of the surface to promote formation of a protective oxide skin. The surface may then be further protected by the deposition of a high temperature, stable, non-volatile metal oxide on the pre-oxidized substrate surface by thermal decomposition from the vapor phase of a volatile compound of the metal.

While the chemical vapor deposition of an alkoxysilane has been demonstrated to reduce the rate of coke formation in the pyrolysis section of an ethylene steam cracker by formation of an amorphous silica film on the internal surfaces of high alloy steel tubing at 700° to 800° C., no one to data has solved the problem of coke deposition on fuel contacting hardware in gas turbine engines.

SUMMARY OF THE INVENTION

The present invention relates to a material for reducing coke formation on fuel contacting components of gas turbines, such as in the combustor and afterburner of a jet engine. A thermally resistant barrier is applied to prevent contact of the fuel with catalytic agents such as iron, nickel, and chromium, contained in the base metals from which fuel contacting components are fashioned. Specifically, the fuel contacting components are coated with a thin, high temperature resistant, mechanically stable layer of a compound selected from the carbides, nitrides, and borides of titanium, or mixtures thereof, which reduces the rate and severity of coke deposition.

DESCRIPTION OF THE PREFERRED EMBODIMENTS

Coke deposition has been found to be an undesirable side effect caused by the thermally accelerated degradation of hydrocarbon fuels during their use for power generation in gas turbine engines. It is a particular goal of the present invention to produce fuel contacting components for gas turbine engines, such as fuel nozzles, fuel lines, and augmentor spray manifolds, and such other components as lubrication systems and breather tubes, having reduced tendencies to form coke.

It is known that hydrocarbon fuels may degrade either under high temperature conditions, i.e. thermally, or under lower temperature conditions in the presence of a catalytic material. One approach to the problem in the past has been to regulate the quality of the fuel consumed, so as to limit degradation thereof. However, as engines are required to run faster and hotter to achieve greater output, the ability of present day hydrocarbon fuels to provide the required performance without coking is lessened.

Further, since many of the metals required for the construction of higher temperature gas turbine engines are catalytic to the degradation of hydrocarbon fuels, coke formation has become of greater concern. Accordingly, materials have been sought which would increase the temperature at which engines may operate without degradation of the fuel and deposition of coke. It has now been found that provision of a suitable coating on fuel contacting surfaces, which acts as a barrier between the hydrocarbon and the catalytic elements in the surfaces, will greatly reduce coke formation. Certain high temperature resistant materials either do not participate in the mechanism of catalytic-thermal deposition of coke, or participate to a much lesser degree than such metals as iron, nickel, chromium, or their alloys. It has also been noted in the course of our investigations that certain materials actually enhance the degradation of carbon containing fuels. These same materials, when exposed to elevated temperatures, cause any gums and/or varnishes which do form to completely burn away. A suitable coating has been found to comprise a uniform, thin layer of a compound selected from the carbides, nitrides, and borides of titanium, or mixtures thereof, which layer is free of organic constituents such as binders, and is at least about 99.5 percent pure. This layer may be applied to the surface by conventional coating techniques such as plasma spray, cathodic arc plasma deposition, sputtering, physical or chemical vapor deposition, ion plating, diffusion coating, deposition from a slurry or sol, etc. The preferred method of application is by vapor deposition. The layer should be applied in a thickness of from about 0.00005 inches to about 0.0003 inches, and preferably from about 0.0001 to about 0.0002 inches. Such a coating is stable in hydrocarbon fuels, and is thermally stable in air at temperatures from about minus 100° F. to about 2550° F., limited by the maximum temperature capability of the substrate. Sub-coats or bond coats may be present if necessary to achieve an adherent bonding to the substrate.

A number of primary factors were identified which relate to the deposition of hydrocarbons in gas turbines. These include fuel composition, temperature, time, the availability of oxygen, and the presence of catalytic materials in the surface of the fuel handling components. For an operating gas turbine, each of these factors has an almost infinite number of possible values, with the exception of the composition of the fuel contacting elements of the gas turbine engine itself. Accordingly, the present invention is directed to control of the surface composition of the fuel handling components of the gas turbine engine, and specifically to the provision of titanium carbide, nitride, or boride surface coatings thereupon to reduce the deposition of carbon, or coking.

Alloys used in hydrocarbon fuel burning engines commonly contain metals which catalyze coke deposition, such as iron, nickel, and chromium. Thermal degradation occurs as a matter of course, and there are periods during the operation of turbine engines when fuel flow is very low, or as in the case of military engine augmentor plumbing, i.e. fuel feed tubes and spray manifolds, there is no fuel flow at all. During such periods, the temperature of the residual fuel left in the plumbing can rise, causing the fuel to boil and increase coke deposition from accelerated fuel degradation reactions and thermal cracking. The contributions of various metallic hardware surfaces to coke deposition were evaluated with a goal of determining the best method for reducing the formation and adherence of coke. It has been learned that coking may be reduced by the presence of a surface layer of an anti-coking material on the surfaces of the fuel handling components of a gas turbine engine. Such anti-coking material may be of a nature to either reduce or inhibit the tendency of coke to adhere to the surface, or, conversely, to enhance the catalysis of the surface and increase the reactivity such that any gums and varnishes which tend to form are caused to react further, breaking them down to gaseous products which are eliminated.

Surfaces which may be coated for prevention of coking include fuel lines, fuel nozzles, augmentor spray manifolds, and other hydrocarbon contacting surfaces of gas turbines, such as lubrication systems and breather tubes. Such surfaces may comprise such materials as titanium and titanium alloys, aluminum, stainless steels, and nickel base alloys such as Inconel and Waspaloy. In addition, the present invention may be suitable for prevention of coking on other surfaces, such as copper, zirconium, tantalum, chromium, cobalt, and iron, for example. While the examples which follow relate to coating components fashioned of Waspaloy or Inconel alloys, it is to be understood that the present invention is not to be limited thereto.

To evaluate the effectiveness of experimental coatings in reducing the tendency of jet fuel to form coke deposits on a metal substrate, Waspaloy samples were utilized under conditions simulating the operational conditions to be anticipated in a high performance military aircraft engine. In a typical military flight scenario, fuel is heated as it travels through the fuel plumbing on its way to the combustor and/or augmentor of the engine to be burned. Generally, the fuel flow rate is sufficiently high to limit the effect of those factors which relate to coking. However, during flight, when the augmentor is shut off, spray manifold temperatures in the afterburner section rise considerably, going from about 350° F. to about 1000° F. or higher in some areas. Fuel left in the spray manifold in these areas boils, and with no place to flow, degrades rapidly to form insoluble, sticky, gum-like varnishes, which after a number of cycles results in formation of coke deposits. A similar scenario occurs in the engine combustor fuel nozzles at engine shutdown. However, since the augmentor is cycled on and off much more frequently than the engine is, it is to be expected that the augmentor fuel plumbing would have a higher coking rate than the combustor fuel nozzles. Accordingly, the conditions encountered at the spray manifold of the augmentor section were selected as representative of conditions which result in coke deposition.

EXAMPLE 1

Special liquid/vapor phase reactors were constructed to enable evaluation of several alloy types and candidate coatings for the fuel deposit buildup tendencies. The reactors were designed so that the coking variables, i.e. temperature, time, fuel composition, oxygen availability, and plumbing material, could be controlled and varied to simulate conditions as desired.

The reactors comprised a Pyrex ® glass test tube closely fitted within a stainless steel tube with Swagelok ® stainless steel end caps. A two way valve permitted introduction of desired atmospheres and pressure, through a drilled and back welded twelve inch length of stainless steel tubing. The top reactor fitting permitted disassembly of the reactor for cleaning and loading of new test materials. A two way valve was used to control flow of fuel and atmosphere. The Pyrex glass tube was utilized to minimize contact of the fuel and its vapor with the metallic reactor walls, ensuring that results were representative of coking on the test washers only. The test washers were hung in the vapor space of the reactor from a type 316 stainless steel tube, bent to suspend and keep separated a blank or uncoated Waspaloy washer and the washer being tested. In this way, any slight variations during the coking test would be negated, since both the control and test washers would be affected equally. Test temperatures were controlled by placing the reactors in a heated aluminum block, controlled at plus or minus 2° F. of the desired temperature. Test washers were $\frac{3}{4}$ inch diameter, with a $\frac{1}{4}$ inch hole in the center. Test washers were coated as set forth below, and were tested against uncoated, or "blank" washers to determine effectiveness of the coatings applied.

Coatings of titanium carbide and titanium nitride were applied to test washers by chemical vapor deposition, resulting in coating thicknesses of from about 0.0001 to about 0.0002 inches.

The amount of fuel chosen for use in the tests and the size of the reactors were based upon the estimated residual fuel left in an augmentor spray manifold of a military aircraft engine after shutdown, and the spray manifold total internal volume. The Number 3 spray manifold was chosen since it was known to have the most severe coking problem for the specific engine being simulated. The residual fuel volume to vapor space volume was estimated to be 1:7.5. Accordingly, the fuel volume used in these tests was 10 ml, and the reactor vapor space volume was about 75 ml, to simulate actual engine conditions.

In order to approximate the cycling of an augmentor, the time at temperature for the reactors was cycled. Three 1.5 hour cycles were used. At the end of each cycle, the reactors were weighed, rapidly cooled in water, depressurized, repressurized with 30 psig air, and replaced in the heated block. After the third cycle, the reactors were opened and the test washers were dried at 230° F. for 15 minutes. The washers were then weighed to determine the percentage increase or decrease relative to the blank Waspaloy washer.

The tests were conducted at 550° F., and air pressure of 30 psig. Air pressures above this caused auto-ignition of the fuel, evidenced by copious sooting within the reactors, at 550° F. and above. Pressures below this value produced incrementally lower deposit weights, so to obtain measurable deposit weights within a reasonable time, the 30 psig pressure was selected. The test fuel used was JP-4, taken from a single two gallon sample stored at room temperature.

In addition to measuring coke deposition on the test washers, a second test was conducted to determine whether the coating applied to the washer possessed the ability to reduce the temperature of carbon burnoff relative to Waspaloy. For this test, the burnoff temperature and the amount of deposited carbon were determined by use of a LECO Model RC412 Multiphase Carbon Determinator. An air combustion atmosphere was used rather than oxygen, to simulate actual flying conditions. Test results are as set forth in TABLE I, below. Since the LECO carbon analysis confirmed the gravimetric results, only the LECO carbon result is given for percent change in coking.

TABLE I

| CARBON DEPOSITION AND BURNOFF | | |
|---|---|---|
| Surface | Change | Burnoff Temp. |
| Waspaloy, uncoated | — | 930° F. |
| Titnaium nitride | −50% | 957° F. |
| Titanium carbide | −25% | 930° F. |

Similar results are obtained when a washer coated with titanium boride is subjected to the same tests. These results indicate that protective surface coatings may be applied to fuel contacting elements to inhibit carbon deposition and coking.

It is to be understood that the above description of the present invention is subject to considerable modification, change, and adaptation by those skilled in the art to which it pertains, and that such modifications, changes, and adaptations are to be considered within the scope of the present invention, which is set forth by the appended claims.

What is claimed is:

1. A fuel contacting element of a gas turbine engine, said element selected from the group consisting of fuel nozzles, fuel lines, and augmentor spray manifolds, and comprising a material selected from the group consisting of titanium, titanium alloys, aluminum, stainless steel, and nickel base superalloys, wherein the improvement comprises the presence of a coke inhibiting layer thereupon selected from the group consisting of titanium carbide, titanium nitride, titanium boride, and mixtures thereof.

2. The element of claim 1, wherein said layer is from about 0.00005 inches to 0.0003 inches in thickness.

3. The element of claim 2, wherein said layer comprises titanium carbide, and is from 0.0001 inches to 0.0002 inches in thickness.

4. The element of claim 2, wherein said layer comprises titanium nitride, and is from about 0.0001 inches to 0.0002 inches in thickness.

5. The element of claim 2, wherein said layer comprises titanium boride, and is from 0.0001 inches to 0.0002 inches in thickness.

6. A spray manifold for the augmentor section of a jet engine, said manifold comprising a high temperature resistant metal alloy wherein the improvement comprises a coke inhibiting layer on fuel contacting surfaces of said manifold, said layer comprising a material selected from the group consisting of titanium carbide, titanium nitride, titanium boride, and mixtures thereof.

7. The spray manifold of claim 6, wherein said alloy is selected from the group consisting of titanium, titanium alloys, aluminum, stainless steel, and nickel base superalloys.

8. The spray manifold of claim 7, wherein said alloy is selected from Waspaloy and Inconel alloys.

9. A spray manifold for the augmentor section of a jet engine, said manifold comprising a high temperature resistant metal alloy having a coke inhibiting layer of titanium carbide having a thickness of from about 0.00005 inches to 0.0003 inches on the fuel contacting surfaces.

10. The spray manifold of claim 9, wherein said alloy is selected from the group consisting of titanium, titanium alloys, aluminum, stainless steel, and nickel base superalloys.

11. The spray manifold of claim 10, wherein said alloy is Waspaloy.

12. A spray manifold for the augmentor section of a jet engine, said manifold comprising a high temperature resistant metal alloy wherein the improvement comprises a coke inhibiting layer of titanium nitride having a thickness of from about 0.00005 inches to 0.0003 inches on the fuel contacting surfaces.

13. The spray manifold of claim 12, wherein said alloy is selected from the group consisting of titanium, titanium alloys, aluminum, stainless steel, and nickel base superalloys.

14. The spray manifold of claim 13, wherein said alloy is Waspaloy.

15. A spray manifold for the augmentor section of a jet engine, said manifold comprising a high temperature resistant metal alloy having a coke inhibiting layer of titanium boride having a thickness of from about 0.00005 inches to 0.0003 inches on the fuel contacting surfaces.

16. The spray manifold of claim 15, wherein said alloy is selected from the group consisting of titanium, titanium alloys, aluminum, stainless steel, and nickel base superalloys.

17. The spray manifold of claim 16, wherein said alloy is Waspaloy.

* * * * *

UNITED STATES PATENT AND TRADEMARK OFFICE
CERTIFICATE OF CORRECTION

PATENT NO. : 5,315,822

DATED : May 31, 1994

INVENTOR(S) : William H. Edwards III

It is certified that error appears in the above-identified patent and that said Letters Patent is hereby corrected as shown below:

On the title page, change the title from "GAS TURBINE ELEMENTS REARING COKE INHIBITING COATINGS OF TITANIUM COMPOUNDS" to
--GAS TURBINE ELEMENTS BEARING COKE INHIBITING COATINGS OF TITANIUM COMPOUNDS--.

In Column 1, in the title, change "REARING" to --BEARING--.
In Column 1, in line 51, change "data" to --date--.
In Column 6, in line 2, change "from 0.0001" to --from about 0.0001--.
In Column 6, in line 8, change "from 0.0001" to --from about 0.0001--.

Signed and Sealed this

Thirteenth Day of September, 1994

Attest:

BRUCE LEHMAN

Attesting Officer

Commissioner of Patents and Trademarks